Nov. 7, 1950          L. MORRIS          2,529,306
HYDRAULIC BRAKE SAFETY DEVICE
Filed Nov. 6, 1946
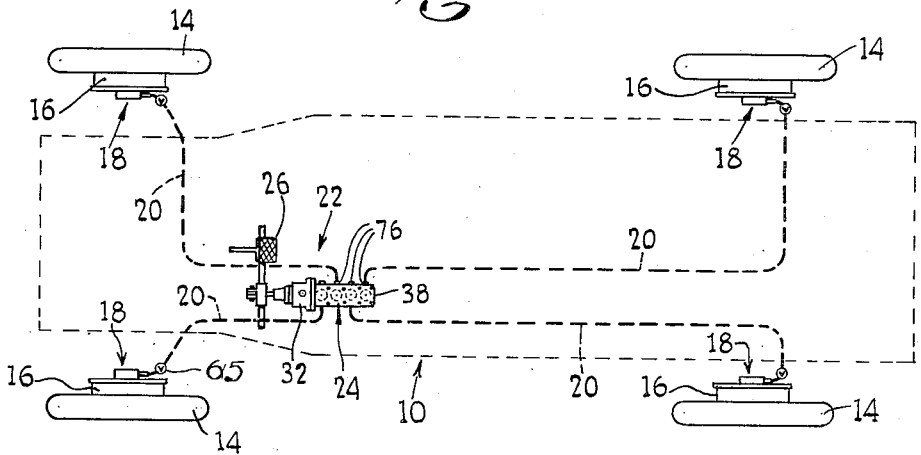
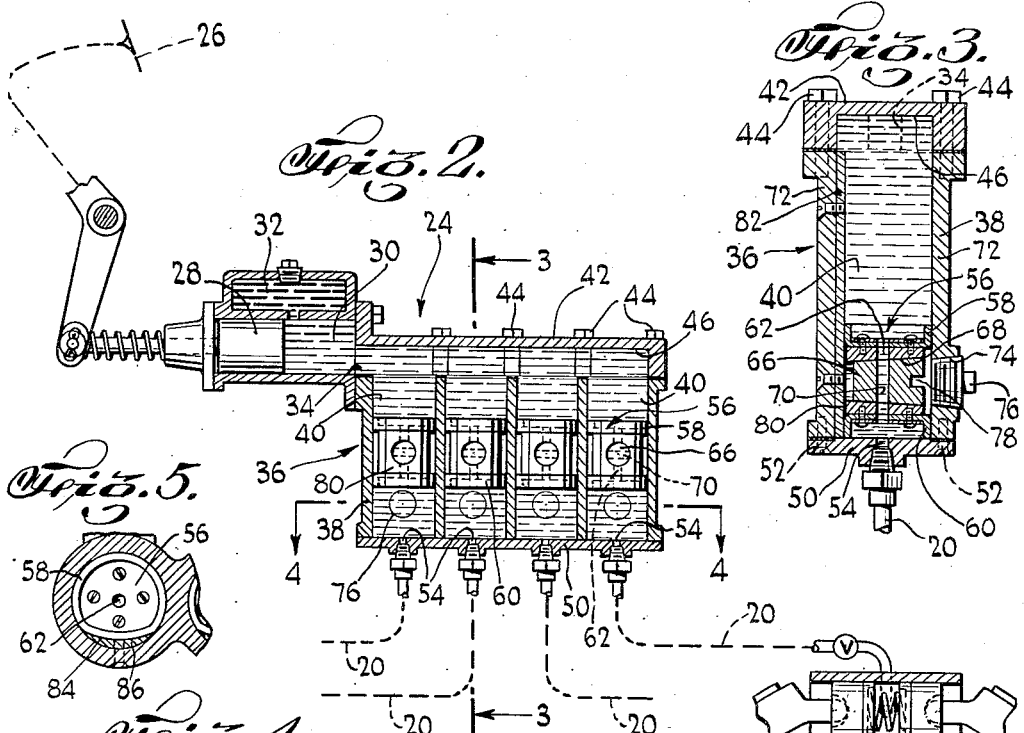
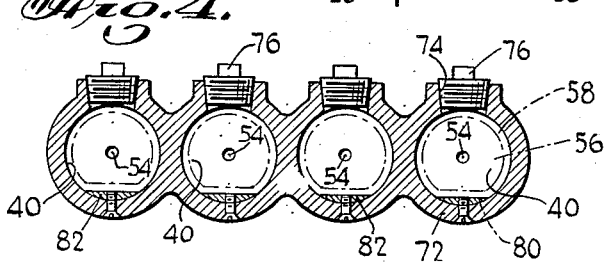
INVENTOR
LEONARD MORRIS
BY Henry L. Durkin
ATTORNEY Patented Nov. 7, 1950

2,529,306

UNITED STATES PATENT OFFICE 2,529,306

HYDRAULIC BRAKE SAFETY DEVICE

Leonard Morris, New York, N. Y.

Application November 6, 1946, Serial No. 708,172

2 Claims. (Cl. 303—84)

This invention relates to hydraulic brake systems.

While the system to be described is considered specifically in connection with hydraulic brakes as commonly used on automotive vehicles, it is to be understood that the invention may have application in other relations, as, for instance, where it is necessary to transmit hydraulic action from a single hydraulic piston to a plurality of other hydraulic pistons. In any of these cases, if any of the conduits which lead to the individual hydraulic cylinders and receive their pressure from the main hydraulic cylinder, or any of the hydraulic cylinders immediately at the wheels, should spring a leak, all of the fluid retained in the system might leak out and make all of the braking devices inoperative. Thus, for instance, on an automotive vehicle having hydraulically operated brakes on all four wheels, the braking fluid could leak out of the entire system, and braking would be impossible on any one of the four wheels. If, however, the effect of the leak could be confined to the particular branch of the system in which the leak had developed, braking action could be effected upon the other, unaffected wheels.

It is an object of the invention to provide apparatus, capable of use in a hydraulic braking system of the type indicated, to guard against leakage of the braking fluid from the entire system in the event a leak should occur in any one of the branches.

It is an object of the invention to provide apparatus by which, in a braking system of the type indicated, direct communication between the master cylinder and the individual or auxiliary cylinders is cut off, but without interference with transmission of the hydraulic force between the master and the auxiliary cylinders, and also the master cylinder may be coupled at will directly to the auxiliary cylinders, as, for instance, to bleed entrapped air out of the auxiliary cylinders, or out of the master cylinder, or out of the conduits between these cylinders.

It is an object of the invention to provide apparatus in which the auxiliary parts of the system may be set at a minimum or normal pressure by operation of the master cylinder through an established direct communication between the master cylinder and the auxiliary cylinders, and thereafter, on breaking such direct communication, the apparatus will function continuously without being disabled by a leak in the system.

Other objects of the invention will be set forth hereinafter, or will be apparent from the description and the drawings, in which is illustrated an embodiment exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiment, herein shown and described, is intended only to be illustrative, and only for the purpose of complying with the requirements of the Statutes for disclosure of an operative embodiment, but not to show all the various forms and modifications in which the invention might be embodied.

On the drawings, in which the same reference characters refer to the same parts throughout, and in which is disclosed such a practical construction, Fig. 1 is a diagrammatic plan view of an automobile having the invention embodied therein, parts of the apparatus being shown in plan;

Fig. 2 is an elevational view of parts of the apparatus shown in 1, to enlarged scale, certain of the parts of the apparatus being broken away in cross-section and other parts being shown diagrammatically;

Fig. 3 is a vertical cross-sectional view, substantially on the line 3—3 of Fig. 2, and to slightly enlarged scale, to illustrate the construction of a detail of the apparatus;

Fig. 4 is a horizontal transverse cross-sectional view, substantially on the line 4—4 of Fig. 2, and to enlarged scale; and Fig. 5 is a detail horizontal cross-sectional view of a portion of the apparatus shown in Fig. 4, and illustrating a further embodiment of that apparatus, the section in Fig. 5 being taken from a position above the piston.

On the drawings, in Fig. 1, the chassis 10 of an automotive vehicle is shown diagrammatically, including the wheels 14, which are shown in dot-and-dash lines. Associated with the wheels are the usual brake drums 16, with which are associated hydraulic devices 18 for moving the shoes into braking contact with drums 16. Conduits 20 (shown by dotted lines in some of the figures) lead from devices 18 toward the driver's position 22 where control of the braking action is effected by apparatus 24.

Apparatus 24 may include the usual brake pedal 26, linked in any desired manner to a piston 28 which operates in a master cylinder 30 associated with a reservoir 32. The master cylinder and reservoir may be made as a single unit, and then may be bolted directly to a block 36 so that conduit 34 leads from cylinder 30 to block 36, which may include a casting 38 having a plurality of bores 40 formed therein. The numbers of the bore preferably is equal to that of conduits 20. A head 42, secured at one end of casting 38 by any suitable means such as bolts 44, has a recess 46 which opens into all of the bores 40. Conduit 34 discharges directly into recess 46.

A plate 50, secured to the end of casting 38 opposite head 42 by any suitable means such as countersunk screws 52, has a plurality of openings 54 formed therethrough. The ends of conduits 20, coupled to plate 50 at openings 54, are individually in communication with bores 40 at their ends opposite recess 46.

In each bore is positioned a piston 56 which preferably has two sealing leathers 58 and 60 secured thereto and facing in opposite directions. Pressure imparted by piston 28 through conduit 34 will be sealed off and will be effective to move pistons 56 in their respective bores. Through the combination of sealing leathers, pressure will be delivered from each bore into the respective conduit 20, and then to the particular device 18 for actuating the brakes against its particular drum 16.

Any desired manner of assembling leathers 58 and 60 with their pistons, generally known in the art, may be utilized. Piston 56, thus freely floating within the bore, will respond to the hydraulic action of piston 28 upon fluid in master cylinder 30, transmitted through conduit 34. On depression of pedal 26, piston 28 will drive fluid from cylinder 30, and thereupon simultaneously move pistons 56 in their respective bores to propel fluid from the respective bores into the respective conduits 20 for operating the respective devices 18.

If any one of the cylinders of devices 18, or if any of the conduits between devices 18 and their connection to openings 54, should commence to leak, the piston 56 in that particular bore will, as the leakage progresses, move gradually down to and then seat against plate 50 at the bottom of the bore. There it will remain, regardless of what actuation is imparted to piston 28, until the leak is repaired. Thus, fluid within only that particular conduit 20 will be lost. The other pistons 56 will continue to respond when piston 28 is actuated. For those hydraulic devices 18 for which their individual pistons 56 still move properly in their respective bores, a positive brake application will be effected upon their respective drums 16, despite the fact that one, or even more, of pistons 56 have moved down and remain seated against plate 50 in their respective bores.

When the vehicle is returned for repairs, the particular part causing the leak, as, for instance, the conduit or cylinder of a hydraulic device 18, is repaired, thus again placing the apparatus in operation. However, in order properly to put the apparatus back into commission, consideration must be given to the air entrapped within bore 40, or conduit 20, or the cylinder of device 18. Each piston 56 is formed with a passage 62, extending through the body of the piston between leathers 58 and 60, suitable openings being formed in the respective leathers to cooperate with passage 62 for facilitating passage of fluid.

Now, if passage 62 be open, on actuation of pedal 26 to drive piston 28 for injecting fluid into conduit 34, fluid will flow through bore 40 and passage 62 to conduit 20. Piston 56 may have been positioned at the bottom of the bore because of leakage or other circumstance, or it will be driven to the bottom of the bore by such actuation just described. Continued pumping on pedal 26 and thereby on piston 28 finally will cause ejection of all air bubbles from the system through the usual valve 65 provided for that purpose. Finally, after all such bubbles have been ejected, valve 65 is closed, and an application of pressure, by means of pedal 26, is made of such degree that devices 18 are set properly at a position of maximum application.

Passage 62, which has remained open throughout these air bleeding operations, must now be sealed off, if the apparatus is to operate properly, and so that liquid in conduit 20 cannot return into conduit 34, and so that pistons 56 may be effective for their purpose. A cock 66 is seated in a bore 68 formed in piston 56 transversely of passage 62. This cock has a valving passage 70 which can be rotated into line with passage 62, during the bleeding of the air from the system. When cock 66 is rotated, passage 70 will be out of alignment and out of communication with passage 62.

For this purpose, walls 72 of casting 38 are formed with openings 74. These openings may be threaded; ordinarily they receive proper sealing members or plugs 76 seated therein. During the bleeding of the air from the system, plugs 76 are removed, and cock 66 is turned by means of a tool engaged in a slot 78 in the cock to bring passage 70 into line with passage 62. At the end of the bleeding operation, slot 78 is engaged again, and cock 66 is turned so that passage 70 is out of alignment with passage 62. Plug 76 may now be returned to seat in its opening 74, and the apparatus is ready to function in the normal manner. On release of pedal 26, the pressure, built up in conduit 20 during the actuation of pedal 26 and before cock 66 was turned to cut off the connection, will be sufficient to push piston 56 back, and thus to return piston 28 to its normal position in the master cylinder.

Piston 56 should maintain a position with relation to bore 40 such that plug 76 will always be in alignment with cock 66 when the piston 56 has reached the lower limit of its travel in the bore. Suitable means, effective to retain piston 56 against rotation with relation to the bore, may be utilized. In one form for this purpose, shown in Fig. 4, piston 56 is turned as a true cylinder. Then a cut is made off the circular wall of this cylinder so as to provide a substantial flat surface 80. A plurality of such surfaces 80, of any desired number, may be provided. One has been shown on the drawings. In each bore 40 an insert 82 is positioned. This insert is the complement of the portion removed from the cylindrical surface when defining surface 80. Insert 82 may be retained in position by any suitable means, as, for instance, by screws extending through walls 72 of the block.

Another form may be made by first turning piston 56 as a true cylinder. The piston, so turned, may then be positioned to rotate eccentrically, and, as shown in Fig. 5, a section 84 is cut from the cylinder by a tool placed at a proper radial distance. An insert 86 is positioned in bore 68 to serve as a complement to this portion removed from the piston. Thus, the out-of-round formation of piston 56 is utilized to maintain the piston in a specific relation to opening 74 so that cock 66 will always be accessible at that particular opening.

Many other changes could be effected in the particular constructions, and in the methods of use and construction, and in specific details thereon, hereinbefore set forth, without substantially departing from the invention defined in the claims, the specific description being merely of an embodiment capable of illustrating certain principles of the invention.

What is claimed as new and useful is:

1. Apparatus for applying simultaneous braking action to a plurality of different members by means of a single actuator, the apparatus comprising a single hydraulic cylinder and component parts for developing hydraulic pressure, a plurality of individual conduits from said cylinder to said members, and means interposed in said conduits for transmitting to the individual conduits the pressure developed in the cylinder, said means including a piston movable freely in each of said conduits for cutting off direct communication between the cylinder and the conduits without interfering with transmission of the hydraulic force, the piston having a passage therethrough to provide communication between the cylinder and the conduits, means for controlling said passage through the piston to cut off flow into the conduit directly from the cylinder, and means for providing access to said controlling means through the walls of the bore.

2. Apparatus for applying simultaneous braking action by means of a single actuator to the wheels of a vehicle, wherein each of the wheels is provided with an individual hydraulically actuated device for applying braking action at that wheel, the apparatus comprising a single hydraulic cylinder, a single piston and actuating means therefor for developing hydraulic pressure, a block having a manifold at one end, a plurality of bores extending through the block and having substantially open communication with the manifold, a plurality of individual conduits leading from said bores to the individual devices, a piston movable freely in each of said bores, said pistons cutting off direct communication between the cylinder and the conduits without interfering with transmission of the hydraulic force through the conduits to the devices, the piston having a passage therethrough to provide communication between the cylinder and the conduits, means for controlling said passage through the piston to cut off flow into the conduit directly from the cylinder, and means for providing access to said controlling means through the walls of the block into the bore.

LEONARD MORRIS.

REFERENCES CITED

The following references are of record in the file of this patent:

UNITED STATES PATENTS

| Number | Name | Date |
| --- | --- | --- |
| 1,557,330 | Reynolds | Oct. 13, 1925 |
| 1,795,818 | Allred et al. | Mar. 10, 1931 |
| 1,986,763 | Rhodes | Jan. 1, 1935 |
| 2,085,628 | Brannan | June 29, 1937 |
| 2,121,653 | Davis | June 21, 1938 |
| 2,198,522 | Adam | Apr. 23, 1940 |
| 2,257,857 | Richards | Oct. 7, 1941 |